US009309003B2

(12) United States Patent
Sannadi et al.

(10) Patent No.: US 9,309,003 B2
(45) Date of Patent: Apr. 12, 2016

(54) ACCESS DOOR FOR POSSIBLE USE WITH A HELICOPTER FUEL TANK

(71) Applicant: Aerazur S.A., Caudebec-les-Elbeuf (FR)

(72) Inventors: Amine Sannadi, Rouen (FR); Nicolas Picco, Abondant (FR)

(73) Assignee: Zodiac Aerosafety Systems, Caudebec-les-Elbeuf (FR)

( * ) Notice: Subject to any disclaimer, the term of this patent is extended or adjusted under 35 U.S.C. 154(b) by 0 days.

(21) Appl. No.: 14/154,611

(22) Filed: Jan. 14, 2014

(65) Prior Publication Data

US 2014/0196378 A1 Jul. 17, 2014

Related U.S. Application Data

(60) Provisional application No. 61/752,071, filed on Jan. 14, 2013.

(51) Int. Cl.
*E06B 7/16* (2006.01)
*B64D 37/00* (2006.01)
*B64C 1/14* (2006.01)

(52) U.S. Cl.
CPC ............ *B64D 37/005* (2013.01); *B64C 1/1446* (2013.01); *E06B 7/16* (2013.01)

(58) Field of Classification Search
CPC ...... B64D 37/005; B64D 29/06; B64D 29/08; B64C 1/1446; E06B 7/16; F16J 15/061; F16J 15/0887; B65D 53/02

USPC ......... 220/315, 319, 378, 233–239, 562, 601, 220/661; 244/129.4; 277/630, 637; 292/256, 256.5

See application file for complete search history.

(56) References Cited

U.S. PATENT DOCUMENTS

| 791,779 | A | * | 6/1905 | Heiser ............................. 220/324 |
| 3,986,635 | A | * | 10/1976 | Niskin ............................ 220/319 |
| 4,273,064 | A | * | 6/1981 | Sutton ............................. 114/203 |
| 4,291,816 | A | | 9/1981 | Lamoureux |
| 4,431,163 | A | * | 2/1984 | Barbe ............................. 251/367 |
| 6,446,907 | B1 | | 9/2002 | Wilson et al. |

FOREIGN PATENT DOCUMENTS

| DE | 680691 C | 9/1939 |
| GB | 2255084 A | 10/1992 |

OTHER PUBLICATIONS

PCT/IB2014/058268, Search Report and Written Opinion dated May 30, 2014, 11 pages.
International Patent Application No. PCT/IB2014/058268, International Preliminary Report on Patentability dated Jul. 23, 2015.

* cited by examiner

*Primary Examiner* — Fenn Mathew
*Assistant Examiner* — James N Smalley
(74) *Attorney, Agent, or Firm* — Kilpatrick Townsend & Stockton LLP; Dean W. Russell, Esq.; Renae Bailey Wainwright, Esq.

(57) ABSTRACT

Systems for improved access door assemblies. In particular, disclosed are boltless/screwless access door assemblies with a radial sealing mechanism. In some embodiments, the access door assembly includes a shoulder configured to withstand interior stresses and a retaining strip configured to withstand exterior stresses. The access door assembly is also configured to be opened when the retaining strip is released.

19 Claims, 2 Drawing Sheets

ACCESS DOOR FOR POSSIBLE USE WITH A HELICOPTER FUEL TANK

RELATED APPLICATION

This application claims the benefit of U.S. Provisional Application No. 61/752,071 filed Jan. 14, 2013 and titled "Boltless Access Door," the entire contents of which are hereby incorporated by reference.

FIELD OF THE INVENTION

This invention relates generally to access doors.

BACKGROUND

Access to particular areas or compartments of a helicopter, aircraft, vehicle or other application may be restricted by an access door. As one non-limiting example, an access door may restrict access to a vehicle's fuel tank, which can be subjected to significant pressure during a crash or other traumatic event. A properly sealed access door can help insulate the area/compartment housing the fuel tank from the rest of the vehicle and thus help contain any pressure rises or leaks within the area/compartment housing the fuel tank. The access door can also permit access to the fuel tank when required, such as during installation or maintenance of the fuel tank system.

Some access door assemblies include a ring that is bonded to the fuel tank and a door placed above and fixed to the ring using a plurality of fastening members, such as screws or bolts. Securing the fastening members in place axially seals the components of the access door assembly in the direction of the fastening members with the force transmitted by the fastening members. Manually securing each of the fastener members to fix the door relative to the ring is time consuming and takes approximately 10 or so minutes to complete, thus increasing installation and maintenance time. Moreover, use of a screwdriver or other suitable tool to fasten and unfasten the fastener members risks damage to the fuel tank. Further, the closing force and thus the sealing of the assembly can be diminished over the lifetime of the fuel tank as the door assembly is fixed and unfixed by screwing and unscrewing each of the fastener members.

In addition, whether a sufficient axial seal is created between the ring and the door depends in large part on the operator and whether the fastener members are positioned and tightened correctly. Because the fastener members maintain the closure of the door assembly and thus bear the brunt of the inner stresses (stresses from within the area/compartment of the access door assembly) and outer stresses (stresses external to the area/compartment that act on the access door assembly), the axial seal can be compromised and the resistance of the door assembly to both inner and outer stresses can be lowered if the assembly process is not performed correctly. This lowered resistance may not meet applicable resistance to crash standards required for certain uses of the access door.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Disclosed in this patent are improved access door assemblies. In particular, disclosed are boltless/screwless access door assemblies that include a radial sealing mechanism. Moreover, the component of the access door assembly that absorbs inner stresses of the compartment is separate from the component of the access door assembly that absorbs outer stresses external to the compartment.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed herein are improved access door assemblies. Such access door assemblies may be used in helicopters, aircraft, or any other desired application. In some cases, the access door assemblies may be used to restrict access to fuel tanks or other components, although use of the assemblies is not so limited.

Figure 1:
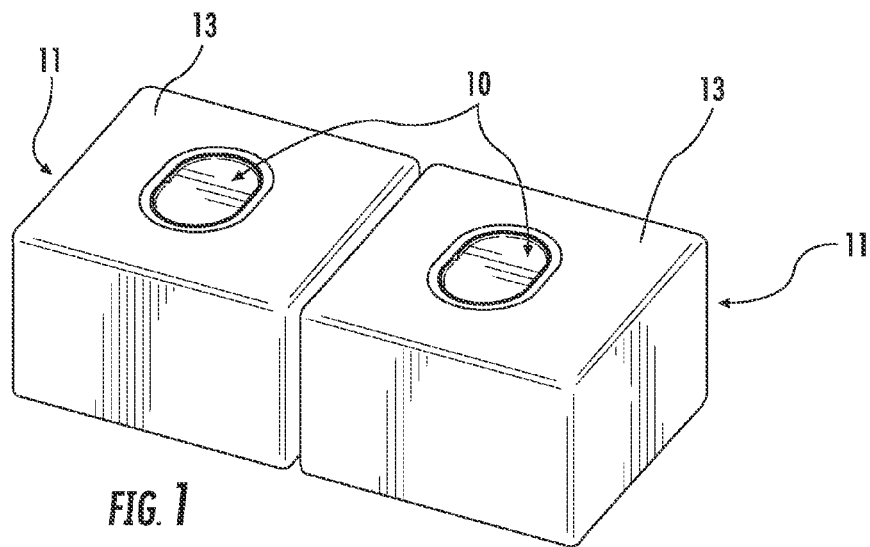
FIG. 1 is a perspective view of two access door assemblies positioned with respect to two compartments.

FIG. 1 illustrates two access door assemblies 10 located on surfaces 13 of two compartments 11. For simplification, the structure with which the access door assembly is used is referred to herein as a compartment, although such term should not be construed as limiting and can reference any suitable enclosure or structure. In some non-limiting embodiments, compartment 11 is a fuel tank or houses a fuel tank, but it need not be. As mentioned, access door assemblies 10 are configured to restrict access to the interior of a structure, such as compartment 11, and to seal the interior of the compartment 11 or structure from its surroundings.

Figure 2:
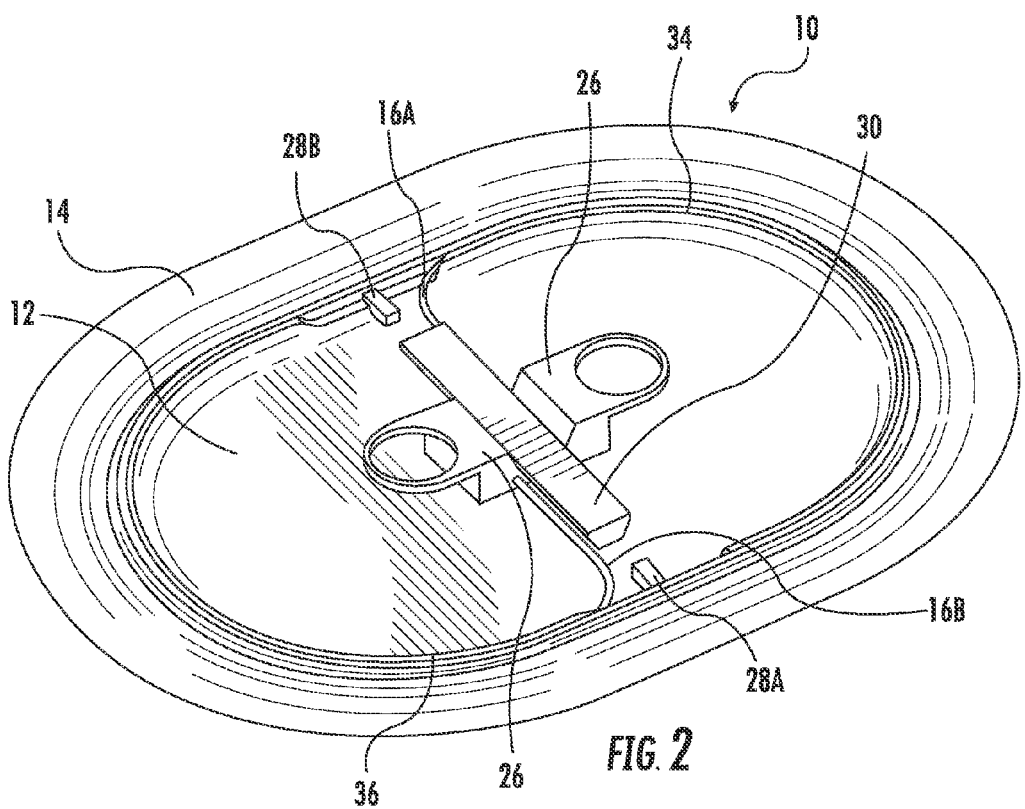
FIG. 2 is a perspective view of an access door assembly according to one embodiment.
Figure 3:
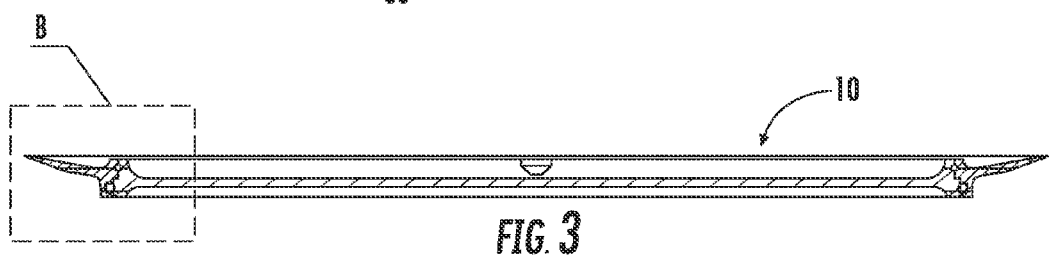
FIG. 3 is a cross-section of the access door assembly of FIG. 2.
Figure 4:
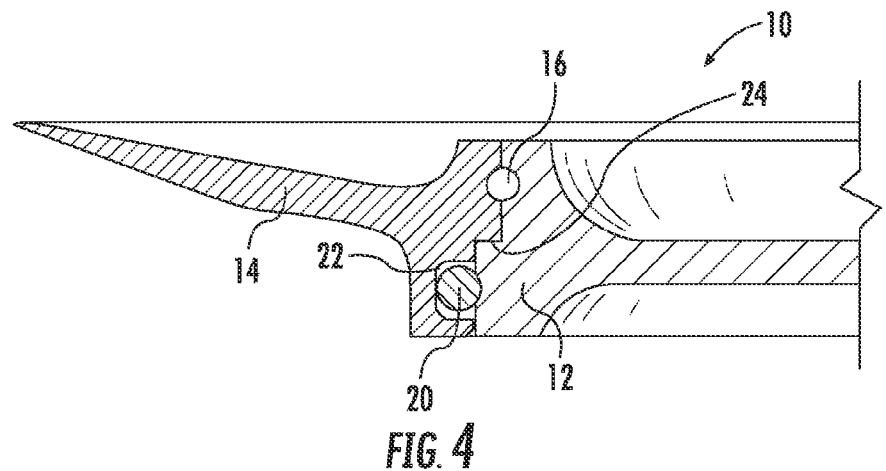
FIG. 4 is a close-up view of FIG. 3, taken at inset B.

FIG. 2 illustrates an access door assembly 10 in isolation. As shown in FIGS. 2-3, access door assembly 10 includes a door 12, a ring 14, at least one retaining strip 16, and a seal 20 (FIG. 4). In the embodiment illustrated in FIG. 2, access door assembly also includes at least one release mechanism 26, a grip 30, and at least one stop 28. Access door assembly 10 may have any desired shape and any suitable dimensions. For example, although door 12 and ring 14 are illustrated as oval-shaped, they are not limited to such a configuration. Door 12 and ring 14 may be made of any suitable materials or combination of materials such as, but not limited to, lightweight metal, alloy, high-performance thermoplastic polymer, composites or any suitable combination. Some non-limiting examples of materials from which door 12 and/or ring 14 may be formed include 2024 aluminum or polyphthalamide (PPA) with electrostatic discharge properties.

Figure 5:
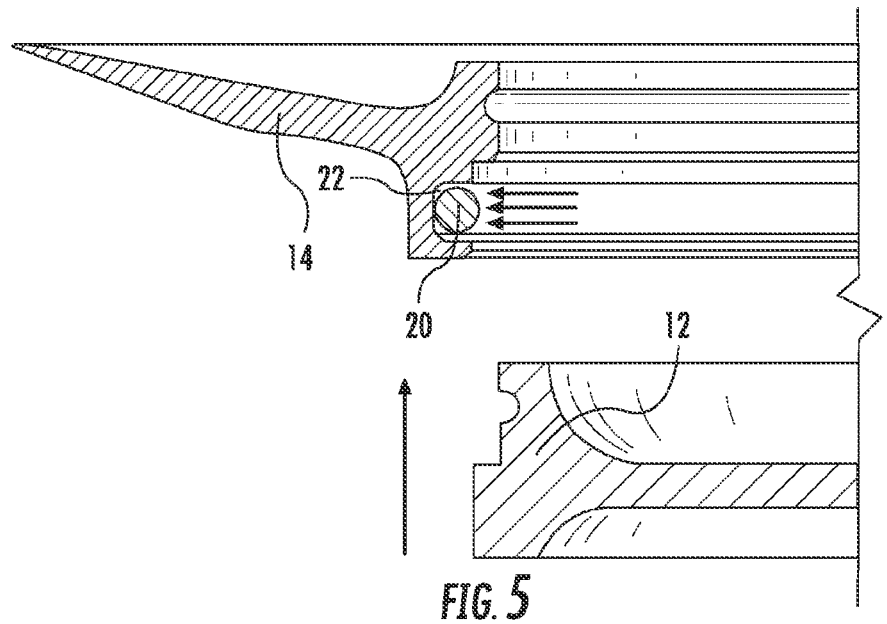
FIG. 5 is a cross-sectional view illustrating the ring relative to the door.
Figure 6:
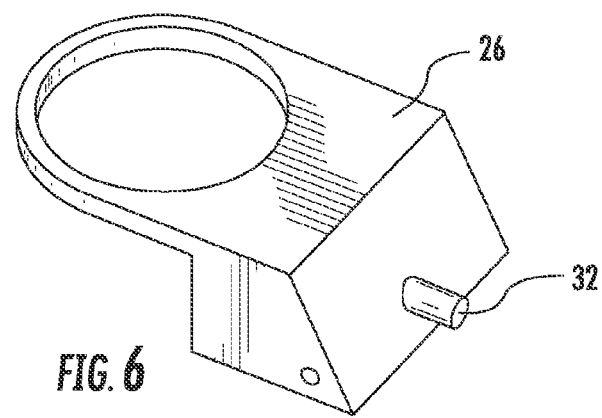
FIG. 6 is a perspective view of one embodiment of a release mechanism of the access door assembly of FIG. 2.

As shown in FIGS. 3-5, door 12 is assembled with respect to ring 14 such that door 12 is below ring 14 (i.e., toward the interior of the compartment 11 or other structure). Specifically, at least a portion of a top surface of the door 12 abuts a lower portion of the ring 14 as shown in FIG. 4. In embodiments where ring 14 is bonded to the interior of compartment 11 or other suitable structure, ring 14 may be assembled with door 12 by inserting door 12 through ring 14 toward the interior of the compartment 11 and then pulling door 12 toward the external surface 13 of compartment 11. Optionally, a grip 30 (shown in FIG. 2) is included to help assemble door 12 within ring 14 and hoist door 12 into position. If used, grip 30 can be fixed or removable. In other embodiments, access door assembly 10 does not include a grip at all. In one alternate embodiment, access door assembly instead includes a cavity that engages with a suitable tool for hoisting door 12 in position with respect to ring 14.

As shown in FIG. 4, access door assembly 10 includes a seal 20. Seal 20 is positioned within a groove 22 that extends at least partially around a circumference of the access door assembly 10. Groove 22 may extend within either door 12 or ring 14. Seal 20 is a radial seal that radially seals door 12 with respect to ring 14 substantially around the entire periphery of the access door assembly 10. In some embodiments, seal 20 is made of a flexible material such as, but not limited to, rubber (e.g., nitrile (NBR), fluoroelastomer (FKM), etc.) and has a round cross section to help absorb shear resistance, although seal 20 can be made of any suitable material and have any suitable cross section.

As shown in FIG. 4, access door assembly 10 includes an abutment 24, where a portion of the upper surface of the door 12 abuts a portion of the lower surface of the ring 14. Abutment 24 is configured to absorb the stress/load associated with any pressure changes of the interior of compartment 11 or other suitable structure.

In addition, at least one retaining strip 16 is positioned within a channel of either door 12 or ring 14. The at least one retaining strip 16 is configured to absorb any stresses/loads external to the compartment 11 (or other structure) that are acting on the access door assembly 10. In this way, the access door assembly 10's resistance to outer stresses and inner stress are provided by two different mechanisms, the abutment 24 and the at least one retaining strip 16. As such, the at least one retaining strip 16 is only loaded with a fraction of the stresses applied to the access door assembly 10.

The at least one retaining strip 16 is made of a harder material than the seal 20 to ensure the at least one retaining strip 16 substantially fills any gap between door 12 and ring 14 when the two are assembled. The at least one retaining strip 16 may be made of a thermoplastic polymer such as PEEK or any other suitable material.

In the embodiment shown in FIG. 2, two retaining strips 16 are used, although any suitable number of retaining strips 16 may be used. Each of retaining strips 16 extends from a release mechanism 26. As illustrated, the release mechanism 26 is a pull ring, although release mechanism 26 can have any suitable configuration. When assembled, each of the retaining strips 16 is pushed through a channel until it abuts a stop, such as a stop 28. For example, in the embodiment illustrated in FIG. 2, a first retaining strip 16A passes through channel 34 until the retaining strip 16A abuts stop 28A to seal the right half of the access door assembly, while a second retaining strip 16B passes through channel 36 until the retaining strip 16B abuts stop 28B to seal the left half of the access door assembly. Abutment of retaining strip 16 with the stop 28 provides an indication that the at least one retaining strip 16 has been properly positioned and the access door system 10 is in its sealed position. This indication enhances the safety of the access door assembly 10 by ensuring that the access door assembly is properly locked/sealed when so desired. When properly sealed, the access door assembly 10 is referred to as being in a sealed position. When in the sealed position, a tight (in some cases, an air and/or fuel and/or other medium tight) seal is formed between door 12 and ring 14.

Removing the at least one retaining strip 16 from its channel disengages door 12 from ring 14 and moves the access door assembly 10 out of its sealed position and into an open position. Specifically, since the retaining strip 16 extends from a release mechanism 26, releasing the release mechanism 26 from its installation position causes the associated retaining strip 16 to disengage from its channel, in turn releasing the seal between door 12 and ring 14. In some embodiments, release mechanism 26 includes a lug or other structure 32 that cooperates with any suitable portion (such as but not limited to an aperture of the grip 30) of the access door assembly 10 to maintain the installation position of the release mechanism (and thus maintain the position of the retaining strip 16 within the channel) until the release mechanism is released. In this way, the retaining strip acts like a pin system.

The configuration of the access door assembly system described herein eliminates the need for screws, inserts or other fastener members or tools. This reduces the overall weight of the system and simplifies the manufacturing process. Moreover, the time associated with opening and closing the access door assembly is reduced, in turn reducing installation and maintenance time for maintaining any equipment (such as a fuel tank) stored within the compartment of the access door assembly. In some cases, the time required to open and close the access door assembly decreases from approximately 10 minutes to under approximately 2 minutes.

In addition, the configuration of the access door assembly eliminates potential operator error in closing the access door assembly to create a proper seal and thus helps ensure consistent resistance to any pressure surges or leaks experienced in the interior of the compartment or outside the compartment. In particular, externally applied force is not required to activate and maintain the seal of the access door assembly and thus the mechanical resistance of the locking system of the access door assembly is independent of operator manipulation and outside forces. This is a benefit over prior systems, where external axial forces applied by fastener members created the axial seal.

Further, because the structure absorbing the inner stresses (stresses acting on the door assembly from within the interior of the compartment) is separate from the structure absorbing the outer stresses (stresses acting on the door assembly external to the compartment), the structural integrity of the seal is increased and is less likely to fail. In particular, the abutment 24 absorbs the inner stresses while the at least one retaining strip 16 absorbs the outer stresses. In this way, the inner stresses are not transmitted to the at least one retaining strip 16 and the outer stresses are not transmitted to the abutment 24.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The invention claimed is:

1. An access door assembly configured to seal an interior of a helicopter fuel tank from areas external to the fuel tank, the access door assembly comprising:
    a door;
    a ring;
    a radial seal that extends substantially around a circumference of the access door assembly to form an air and fuel tight seal between the door and the ring;
    a first component configured to absorb stresses acting on the access door assembly from the interior of the helicopter fuel tank; and
    a second component configured to absorb stresses acting on the access door assembly from the external areas, wherein the second component is at least one retaining strip coupled to a release mechanism,
    wherein each of the at least one retaining strips is flexible and is configured to be received within a channel of the door or the ring.

2. The access door assembly of claim 1, wherein the radial seal is the only seal of the access door assembly.

3. The access door assembly of claim 1, wherein the first component is an abutment between at least a portion of a top surface of the door and at least a portion of a lower surface of the ring.

4. The access door assembly of claim 1, wherein the radial seal extends around either the ring or the door and has a generally circular cross section.

5. The access door assembly of claim 1, wherein the access door assembly is configured such that release of the release mechanism from an installation position releases each of the at least one retaining strips from the channel of the door or the ring and moves the access door assembly from a sealed position to an open position that provides access to the fuel tank.

6. The access door assembly of claim 1, wherein the access door assembly is configured to move between a sealed position and an open position without use of tools.

7. The access door assembly of claim 1, wherein the at least one retaining strip is made of a sufficiently hard material to eliminate gaps between the door and the ring, and wherein the sufficiently hard material of the at least one retaining strip is harder than a material of the radial seal.

8. An access door assembly configured to move between an open position and a sealed position, wherein, when in the sealed position, the access door assembly seals an interior of a compartment from areas external to the compartment, the access door assembly comprising:
    a door;
    a ring;
    a seal between the door and the ring that radially seals the door and the ring around the access door assembly;
    at least one retaining strip, wherein each of the at least one retaining strips is configured to be received within a channel of either the door or the ring such that the at least one retaining strip extends from a first end of the channel to a second end of the channel; and
    at least one release mechanism coupled to the at least one retaining strip,
    wherein the access door assembly is configured such that release of the at least one release mechanism from an installation position releases the at least one retaining strip from the channel and moves the access door assembly from its sealed position to its open position,
    wherein the at least one retaining strip is configured to absorb stresses acting on the access door assembly from the external areas.

9. The access door assembly of claim 8, wherein at least a portion of an upper surface of the door abuts a lower surface of the ring.

10. The access door assembly of claim 9, further comprising a grip.

11. The access door assembly of claim 8, further comprising at least one stop proximate the second end of the channel.

12. The access door assembly of claim 8, further comprising an abutment between at least a portion of the ring and at least a portion of the door, wherein the abutment is configured to absorb stresses acting on the access door assembly from the interior of the compartment.

13. The access door assembly of claim 8, wherein the access door assembly is configured to move to its sealed position without the use of screws or bolts.

14. An access door assembly comprising:
    a ring;
    a door comprising a top surface, at least a portion of which abuts at least a portion of a lower surface of the ring;
    a seal configured to extend through a groove of the ring or the door, the seal forming a radial seal between the ring and the door;
    at least one retaining strip, wherein each of the at least one retaining strips is configured to be received in a channel and configured to absorb a first set of stresses acting on the access door assembly;
    wherein the abutment between the at least a portion of the top surface of the door and the at least a portion of the lower surface of the ring is configured to absorb a second set of stresses acting on the access door assembly, wherein the first set of stresses is different from the second set of stresses;
    wherein the access door assembly is configured such that the first set of stresses is not transmitted to the abutment between the at least a portion of the top surface of the door and the at least a portion of the lower surface of the ring and the second set of stresses is not transmitted to the at least one retaining strip; and
    wherein the at least one retaining strip is coupled to a release mechanism and wherein activation of the release mechanism releases the at least one retaining strip from the channel to move the access door assembly from a sealed position to an open position.

15. The access door assembly of claim 14, further comprising a stop proximate an end of the channel.

16. The access door assembly of claim 15, wherein the at least one retaining strip is configured to extend along the channel such that the at least one retaining strip contacts the stop.

17. The access door assembly of claim 14, wherein the at least one retaining strip comprises two retaining strips.

18. The access door assembly of claim 14, wherein the access door assembly restricts access to an interior of a compartment by forming at least one of an air and fluid tight seal between the access door assembly and the compartment, wherein the tight seal is formed between the door and the ring by the seal and the at least one retaining strip alone and without use of fasteners.

19. An access door assembly configured to seal an interior of a helicopter fuel tank from areas external to the fuel tank, the access door assembly comprising:
- a door;
- a ring;
- a radial seal that extends substantially around a circumference of the access door assembly to form an air and fuel tight seal between the door and the ring;
- a first component configured to absorb stresses acting on the access door assembly from the interior of the helicopter fuel tank; and
- a second component configured to absorb stresses acting on the access door assembly from the external areas, wherein the second component is at least one retaining strip coupled to a release mechanism,
- wherein the access door assembly is configured such that release of the release mechanism from an installation position releases each of the at least one retaining strips from a channel of the door or the ring and moves the access door assembly from a sealed position to an open position that provides access to the fuel tank.

* * * * *